United States Patent
Woo

Patent Number: 5,287,232
Date of Patent: Feb. 15, 1994

[54] AUTOMATIC TAPE SEARCHING METHOD

[75] Inventor: Jong-Sam Woo, Seoul, Rep. of Korea

[73] Assignee: SamSung Electronics Co., Ltd., Suwon, Rep. of Korea

[21] Appl. No.: 412,005

[22] Filed: Sep. 25, 1989

[30] Foreign Application Priority Data

Dec. 31, 1988 [KR] Rep. of Korea .............. 1988-18096

[51] Int. Cl.⁵ ............................................ G11B 15/18
[52] U.S. Cl. ..................................... 360/69; 360/72.1; 360/73.05; 360/74.1
[58] Field of Search ............... 360/69, 71, 72.1, 74.1, 360/13, 10.1, 10.2, 10.3, 11.1, 14.1, 73.05, 73.06, 73.07, 72.2, 72.3; 369/19

[56] References Cited

U.S. PATENT DOCUMENTS

| | | | |
|---|---|---|---|
| 4,413,292 | 11/1983 | Sugiyama et al. | 360/72.2 |
| 4,499,509 | 2/1985 | Gohda et al. | 360/72.1 |
| 4,551,774 | 11/1985 | Sakaguchi et al. | 360/72.1 |
| 4,587,577 | 5/1986 | Tsunoda | 360/72.2 |
| 4,716,558 | 12/1987 | Katayama et al. | 360/72.2 X |
| 4,847,708 | 7/1989 | Furuyama | 360/69 X |

Primary Examiner—Andrew L. Sniezek
Attorney, Agent, or Firm—Robert E. Bushnell

[57] ABSTRACT

An automatic (auto) tape searching method which searches the required tape portion fast and automatically by repeating a sequence of operational procedures. The auto tape searching method comprises: a first stage which initializes the port of a microcomputer and the content of a RAM (random access memory), sets the initial values, and controls interrupts at a power-on reset of a video tape recording system; a second stage which checks key input and, for auto random search (ARS) key, performs the auto random search function; a third stage which performs mode checking and, if a present mode needs to accompany the mechanism operation, controls the present mode; and a fourth stage which switches the mode and checks the sensor and an emergency state to make the system in stable condition.

10 Claims, 3 Drawing Sheets

AUTOMATIC TAPE SEARCHING METHOD

BACKGROUND OF THE INVENTION

This invention relates to a tape play position searching method of a video and audio processing system and, more particularly, to an auto tape searching method which includes a forward auto random search key and a rewind auto random search key and which can search a play position fast and automatically by repeating the fast search and play operation for a specific time.

In a conventional video tape recorder, for example, in order to search a play position of a tape, the user could find a portion to play or to record after performing a picture search or manipulating the FAST FORWARD (hereinafter referred to as FF), REWIND (hereinafter referred to as REW), STOP and/or PLAY key several times.

On the other hand, in said conventional methods, the former method using the picture search technique has some disadvantages such that not only it shortens the expected life span of a VTR since the method is apt to abrade the head of VTR drum but also it takes long time to search the required position.

Moreover, the latter search method manipulating several keys also has a problem to cause the user inconvenience since the user should manipulate the keys one by one.

SUMMARY OF THE INVENTION

It is accordingly an object of the present invention to provide an auto tape searching method by repeating a sequence of procedures wherein, according to the search key input of the user, the system performs FF (Fast Forward) or REW (Rewind) for a specified time, stops automatically, plays for a specified time, stops automatically if there is no key input, performs FF-REW (Fast Forward-Rewind) for a specified time, and then plays for a specified time, and, if the user find the desired position during said operation, by starting the play operation at the position where the user presses the PLAY key.

According to one aspect of the invention, the improved method for searching the tape portion required to watch includes: a first stage which initializes the port of said microcomputer and the content of a RAM, sets the initial values, and controls interrupts at a power-on reset of said VTR system; a second stage which checks key input and, for auto random search (ARS) key, performs the auto random search function; a third stage which performs mode checking and, if a present mode needs to accompany the mechanism operation, controls said present mode; and a fourth stage which switches the mode and checks the sensor and an emergency state to make the system in stable condition.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
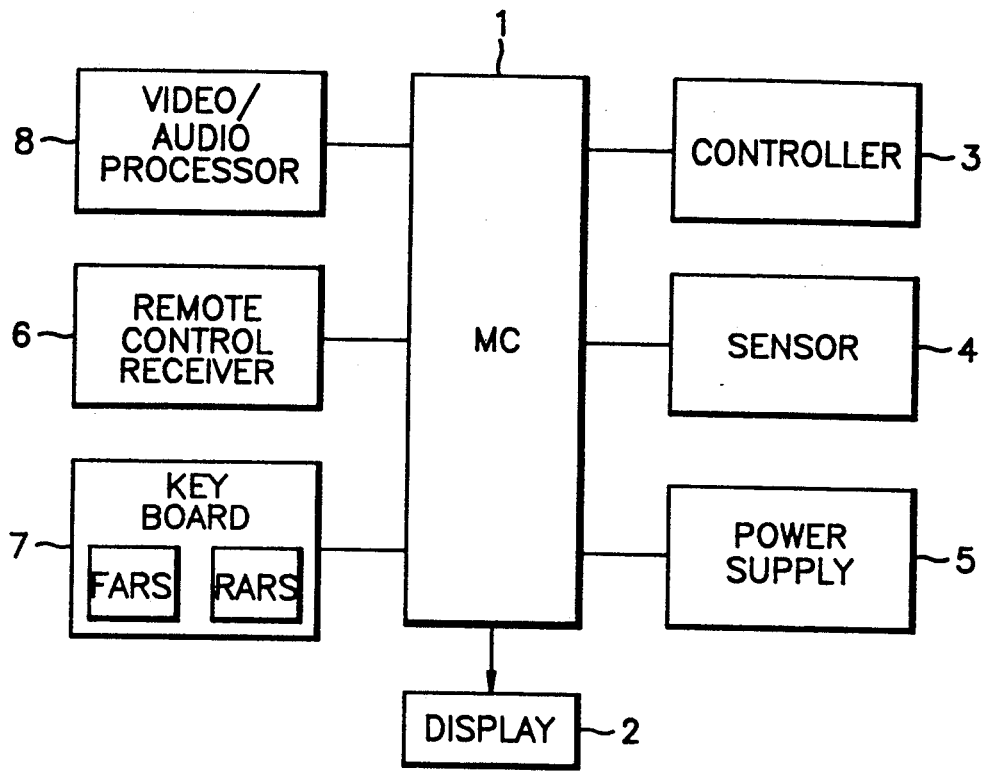
FIG. 1 is a system block diagram of the present invention.

The above objects, effects, and features of the invention will now be more manifest with specific reference to the form of the invention illustrated in the drawings, wherein FIG. 1 is a system block diagram for carrying out the present invention, said system including:

a microcomputer 1 which controls the system;

displaying means 2 which displays the present status of the VTR system according to the user's key input in order that the user can ascertain the status;

a mechanism controller 3 which is used to perform the loading/unloading function such as the INSERT-/EJECT or PLAY of a tape;

a sensor 4 which receives external inputs such as the mechanism control, the perception of reference to move and tape start/end, and REW, etc.;

a power supply 5 which supplies the power to every units of VTR system in order that they can perform their peculiar functions;

a remote control receiver 6 which receives a remotely received control signal from a remote commander, and delivers the signal to said microcomputer 1 after filtering;

a keyboard 7 which constructs a key-matrix and delivers a panel key selected by a user to said microcomputer 1; and a video/audio processing unit 8 which processes the video and audio signal under the control of said microcomputer 1.

Figure 2:
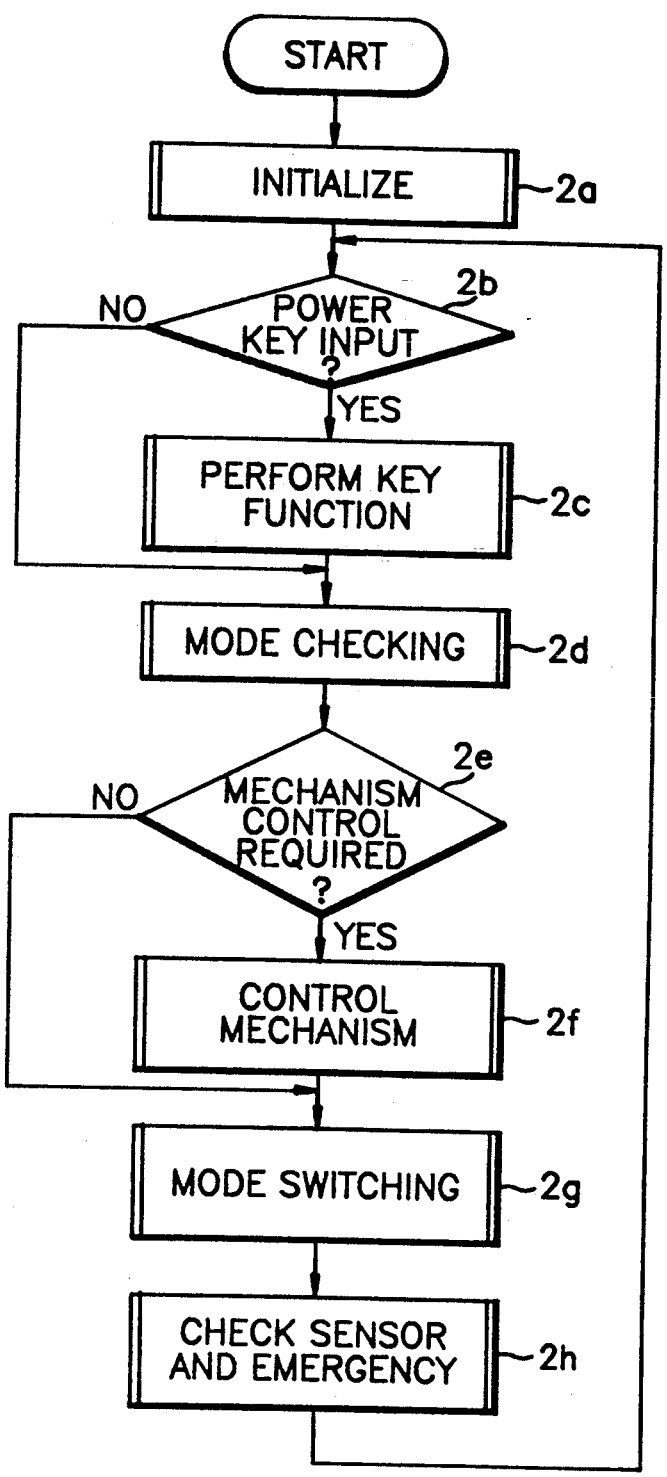
FIG. 2 is a flow diagram for a general operation of a VTR according to the invention.

Referring now further to FIG. 2, there is shown a flow diagram for the general operation accomplishment of the VTR system. Said general diagram is comprised of: a first stage which initializes the port of the microcomputer 1 and the contents of RAM at the POWER ON RESET, sets the initial values, and controls the interrupts; a second stage which it checks the key input after performing said first stage and processes the corresponding key function; a third stage which checks the mode after performing said second stage and controls the mechanism operation if the present mode accompanies the mechanism operation; and a fourth stage which switches the mode after performing said third stage and checks the sensor and emergency to stabilize the system.

Figure 3:
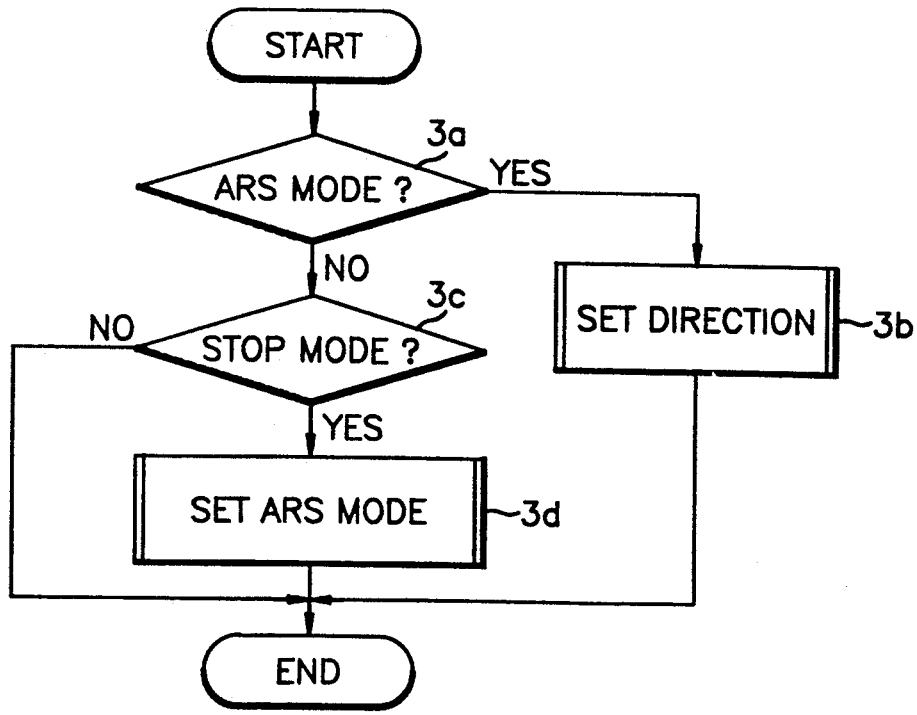
FIG. 3 is a flow diagram for a auto-random-search key function according to the present invention.

According to FIG. 3 for illustrating a flow diagram for the auto random search (hereafter referred to as ARS) key function of the present invention, said key function comprises: a first stage which checks whether the ARS is operating and, if under operation, checks the presence of ARS direction switching input to switch the direction to FF or REW; and a second stage which, if the ARS is not operating at said first stage, checks whether the present status is STOP status, and sets the ARS mode for STOP condition and terminates, or terminates without doing anything for non-ARS mode.

Figure 4:
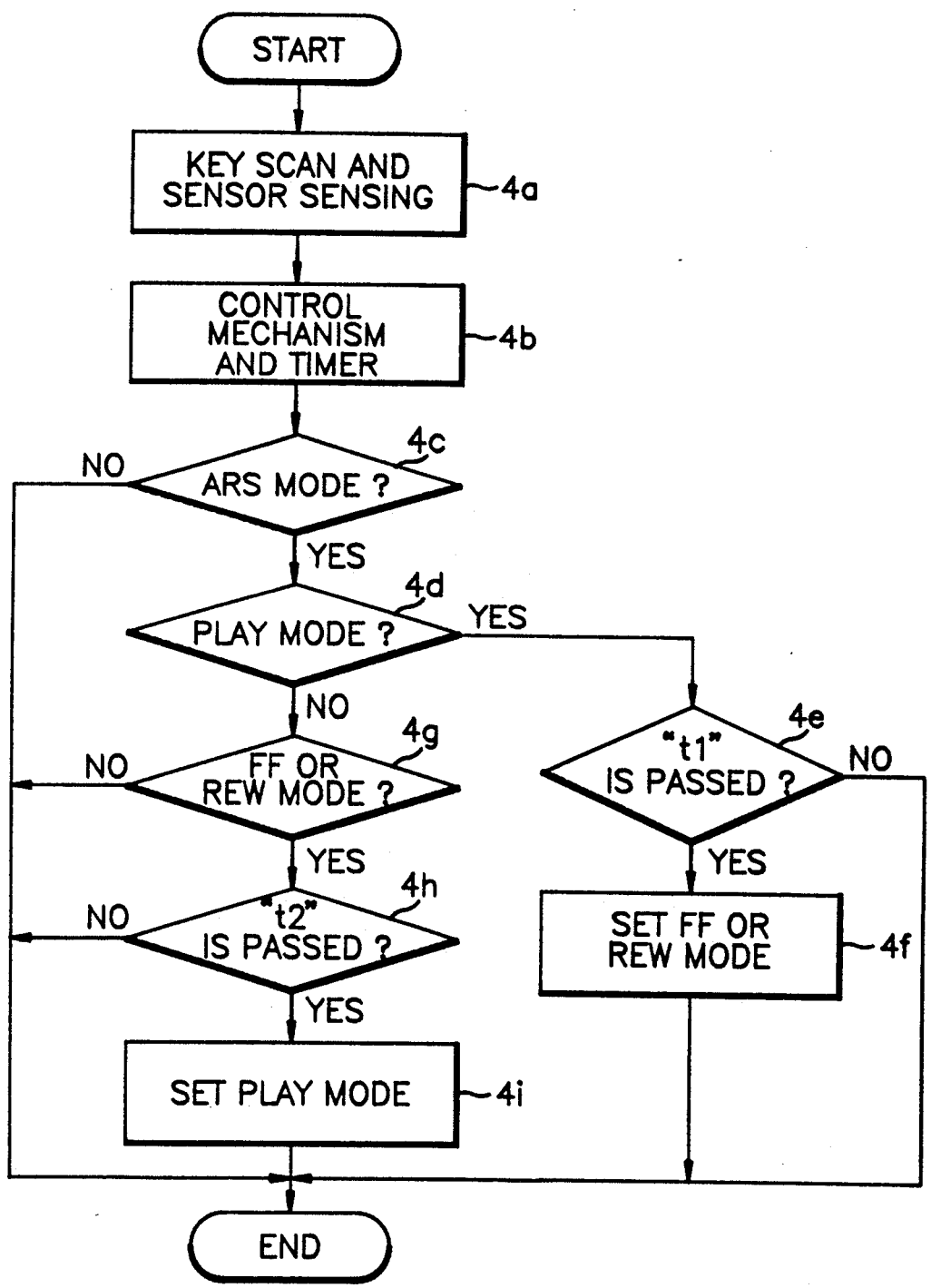
FIG. 4 is a flow diagram for a timer interrupt according to the present invention.

Now, referring to FIG. 4, there is a flow diagram for the timer interrupt comprising: a first stage which performs the sensing of key scan and various sensor inputs and controls the moving time of the mechanism, real time clock, FF(REW), and PLAY time; a second stage which, after performing said first stage, checks whether the mode is ARS mode, and then terminates for non-ARS mode or checks whether the system is playing for ARS mode; a third stage which, if the system is playing at said second stage, checks the PLAY time, and then sets FF or REW mode and terminates for elapsing a specified time or terminates as it is for not elapsing a specified time; and a fourth stage which, if the system is not playing at said second stage, checks whether the system is under FF or REW, and terminates if not under FF/REW or checks if under FF/REW whether the specified time is elapsed, and terminates for not elapsing or sets the PLAY mode for elapsing and terminates.

The present invention will be described in more detail in accordance with said construction.

Referring to FIG. 2 again, being a flow diagram for general operation accomplishment of the VTR system, the stage 2a initializes the I/O ports of microcomputer 1 and the contents of RAM , sets various initial values, and controls a number of interrupts after the power-on. After performing said stage 2a, at stage 2b, said microcomputer scans the keyboard 7 or checks the presence of panel key or remote commander key through the sensor and remote control receiver 6.

As a result of the check, if there exists any key input, the key function corresponding to the entered key characteristics will be performed at stage 2c . For example, if there exists the power key input at said stage 2b, the power-on operation will be performed at stage 2c . And also if there exists the ARS key input at said stage 2b, the ARS key processing routine will be executed at stage 2c . After performing said stage 2c, what the current mode of the system is will be checked at stage 2d.

After performing said stage 2d, stage 2e determines whether the mode accompanies some mechanistic operations If it accompanies some mechanistic operations, the mechanism will be controlled at stage 2f and it will proceed to stage 2g to perform the mode switching.

After performing said stage 2g and it becomes a stable mode, at stage 2h, it receives the sensor input corresponding to the mode and determines whether the set is operating normally or not. In case of abnormal operation, emergency processing is performed to protect the set and it returns to stage 2b.

In order to add the auto tape search function of the present invention to the VTR system which can perform the operation procedures as mentioned above, two special keys are supplied. These are forward auto random search (hereinafter referred to as FARS) and rewind auto random search (RARS) key and, joining together, they are called auto random search key.

The specifications of said keys are as follow. Firstly, the ARS key is valid only at the POWER ON STOP condition. Secondly, after it runs to forward direction (FF), it stops and switches to PLAY mode. After playing for a specified time, it repeats said operations. In this case, said function can be processed using the forward auto random search (FARS) key. Thirdly, after it runs to rewind direction (REW), it stops and switches to PLAY mode. After playing for a specified time, it repeats said operations. In this case, said function can be done using the rewind auto random search (RARS) key. Fourthly, during operating the function of said two keys FARS and RARS, any key input annuls the ARS function. However, an input of said two keys FARS, RARS is valid to each other. Fifthly, if a sensor operation detecting the start or end of a tape is performed, the ARS function is annulled.

Referring the FIG. 3 and FIG. 4, the descriptions of the ARS key function and the timer interrupt routine are followed in accordance with the above-mentioned key specifications.

First of all, in case of ARS key function, if the result of key input check at stage 2b of FIG. 2 is determined to be the ARS key, at stage 2c, it proceeds to the ARS key function processing routine and, at stage 3a of FIG. 3, the microcomputer 1 checks whether the present status is operating the ARS operation. If the result of the check is proved to be under ARS operation, it proceeds to stage 3b to check the presence of the ARS direction switching.

That is to say, if the same direction key is pressed, this will be skipped, and if the opposite direction key is pressed, the direction switching setting (FF←→REW) will be performed and it will return to stage 2d of main program of FIG. 2.

For said stage 3a, if it is not performing the ARS operation, it proceeds to stage 3c and checks whether the present status is STOP mode. In case of stop mode, it proceeds to stage 3d, sets the system to ARS mode in order that the system can perform the FARS or RARS operation, and then returns to stage 2d. For said stage 3c, if the present status is not the STOP mode, it proceeds to stage 2d without doing any other functions as if no key is pressed. However, for any other key functions, the ARS mode setting will be reset.

Moreover, according to the present invention, a timer interrupt routine for alternating the play status and the REW/FF status of tape for a specified time in ARS mode, is required and is constructed as the flow diagram of FIG. 4.

At stage 4a, it scans the key pressed by the user, senses the inputs from various sensors, and proceeds to stage 4b to control the moving time of the mechanism, real time clock, or FF (REW) and PLAY time count up.

After performing said stage 4b, the present status will be checked at stage 4c. If it is not the ARS mode, the interrupt will be terminated and otherwise it will proceed to stage 4d and check whether the present status is under PLAY. If the result of the check is under the play mode, the buffer value of timer is compared with a specified time at stage 4e. If the play mode has been run for the desired time (t1), it proceeds to stage 4f, stops the mode, controls the system in order that the system can be FF or REW, and terminates.

At said stage 4d, if it is not under the play mode, it proceeds to stage 4g and checks whether the system is operating FF/REW or none. As a result of the check, if the system is operating FF or REW, it proceeds to stage 4h and compares said FF/REW operation time with the setting time (t2). If they are equal, at stage 4i, it controls the system in order that the system can operate the play mode and terminates. At said stage 4g, if it is not operating the FF/REW, or, at said stage 4h, if the operation time is not equal to the setting time t2, it stops without any operation.

For said operation of the present invention, FF or REW random search function is performed by two keys. However if one key can be toggled to FF or REW, the same effect can be obtained by using one key embodying two key operation.

As described above, when a user searches the desired portion of a tape, by pressing a specific key, watching the picture of the tape operating the auto search function, and responding with a key (i.e. pressing the PLAY key) when the desired portion is appeared, some advantages such that not only it doesn't need multiple key operation and the desired portion can be conveniently searched but also it lengthens the life span of the VTR system to its maximum extent since it doesn't take a long time required as in the picture search and reduces the damages on the VTR head, are obtained.

While the invention has been particularly shown and described with reference to a preferred embodiment, it will be understood by those skilled in the art that modifications in detail may be made without departing from the spirit and scope of the invention.

What is claimed is:

1. An automatic tape searching method in a video tape recorder system having a microcomputer, a mechanism controller, a forward auto random search key, and a rewind auto-random search key, said automatic tape searching method comprising the steps of:
    initializing ports of said microcomputer;
    initializing contents of a memory in said microcomputer;
    setting various initial values of the system;
    controlling interrupts of the system after power on reset of said system;
    checking for a key actuation;
    determining if said key actuation is from an auto-random search key and, if said key input is from an auto-random search key, performing an auto-random search function for a first predetermined time period;
    automatically switching to a play mode and playing a tape in said system for a second predetermined time after said first predetermined time period has elapsed; and
    repeating said steps of performing an auto-random search and switching to a play mode until a key actuation other than one of said auto-random search keys is detected.

2. The automatic tape searching method as set forth in claim 1 further comprising the steps of:
    determining the mode of operation of the system and, if a current mode is accompanied by a mechanism control from said mechanism controller, performing said mechanism control; and
    changing the mode of operation of the system if said current mode is not accompanied by said mechanism control.

3. The automatic tape searching method as set forth in claim 2 further comprising the steps of:
    checking to determine whether the system is operating normally after changing said mode of operation; and
    performing emergency processing if said system is not operating normally in order to protect the system and returning to said step of checking for a key actuation.

4. The automatic tape searching method as set forth in claim 2, wherein said auto-random search function comprises the steps of:
    determining if the system is currently in an auto-random search mode and, if said system is in an auto-random search mode, determining the direction in which said auto-random search mode is searching;
    comparing said direction determined with a desired direction indicated by said auto-random search key actuation; and
    switching a direction setting of said system to said desired direction if said desired direction is different from said determined direction.

5. The automatic tape searching method as set forth in claim 4, wherein said auto-random search function further comprises the steps of:
    determining if said system is currently in a stop mode if it has been determined that the system is not currently in an auto-random search mode; and
    setting said system to the auto-random search mode if the system is currently in said stop mode.

6. The automatic tape searching method as set forth in claim 1, wherein said auto-random search function comprises the steps of:
    determining if the system is currently in an auto-random search mode and, if said system is in an auto-random search mode, determining the direction in which said auto-random search mode is searching;
    comparing said direction determined with a desired direction indicated by said auto-random search key actuation; and
    switching a direction setting of said system to said desired direction if said desired direction is different from said determined direction.

7. The automatic tape searching method as set forth in claim 6, wherein said auto-random search function further comprises the steps of:
    determining if said system is currently in a stop mode if it has been determined that the system is not currently in an auto-random search mode; and
    setting said system to the auto-random search mode if the system is currently in said stop mode.

8. The automatic tape searching method as set forth in claim 1, wherein said auto-random search function comprises:
    fast-forwarding said tape during said first predetermined time period in response to a key actuation of said forward auto-random search key, or
    rewinding said tape for said first predetermined time period in response to a key actuation of said rewind auto-random search key.

9. An automatic tape searching process in a video tape recorder system having a keyboard, a microcomputer, a forward auto-random search key on said keyboard, and a rewind auto-random search key on said keyboard, said automatic tape searching process comprising the steps of:
    checking for a key actuation signal from said keyboard;
    determining if said key actuation signal is form an auto-random search key and, if said key actuation signal is from an auto-random search key, performing an auto-random search function for a first time period;
    automatically switching to a play mode and playing a tape in said system for a second time period after said first time period has elapsed; and
    repeating said steps of performing an auto-random search function and automatically switching to a play mode until a key actuation signal from a key other than one of said auto-random search keys is detected.

10. The automatic tape searching method as set forth in claim 9, wherein said auto-random search function comprises:
    fast-forwarding said tape in response to a key actuation signal from said forward auto-random search key, or
    rewinding said tape in response to a key actuation signal from said rewind auto-random search key.

* * * * *

UNITED STATES PATENT AND TRADEMARK OFFICE
CERTIFICATE OF CORRECTION

PATENT NO. : 5,287,232
DATED : Feb. 15, 1994
INVENTOR(S) : Jong-Sam Woo

It is certified that error appears in the above-indentified patent and that said Letters Patent is hereby corrected as shown below:

Column 3,   Line 30,   before "determines", change "2c" to --2e--; and

Line 32,   after "oper-ations" (the first occurrence), insert --.--:

Signed and Sealed this

Thirteenth Day of May, 1997

Attest:

BRUCE LEHMAN

Attesting Officer    Commissioner of Patents and Trademarks